United States Patent [19]

Ross

[11] 4,185,343
[45] Jan. 29, 1980

[54] FRAME CONSTRUCTION FOR MAKING ROUND COMB HONEY

[76] Inventor: Thomas B. Ross, 1721 10th St., NE., Massillon, Ohio 44646

[21] Appl. No.: 942,767

[22] Filed: Sep. 15, 1978

[51] Int. Cl.² .......................................... A01K 47/02
[52] U.S. Cl. ............................................................. 6/10
[58] Field of Search ..................................... 6/10, 2 R

[56] References Cited

U.S. PATENT DOCUMENTS

| | | | |
|---|---|---|---|
| 1,170,299 | 2/1916 | Lupke | 6/2 R |
| 2,146,844 | 2/1939 | Panei | 6/10 |

Primary Examiner—Louis G. Mancene
Assistant Examiner—Daniel J. Leach
Attorney, Agent, or Firm—Frease & Bishop

[57] ABSTRACT

An improved frame section which is adapted to be mounted in a beehive in abutting relationship with a plurality of similar frame sections for making round comb honey. A plurality of circular openings are formed by cylindrical walls in each of the frame sections. A plurality of cylindrically shaped, horizontally extending chambers or "rounds" are formed by abutting pairs of the cylindrical walls of adjacent frame sections. The cylindrical frame walls each have a pair of arcuate zones of reduced axial lengths with respect to a second pair of intervening arcuate zones of greater axial lengths. The smaller axial length zones form a series of top and bottom openings along the frames when assembled, to provide access openings for the bees to the interior chambers. A ring is telescopically seated within each of the frame openings to form the sidewalls of a container for the formed combs. The ring has two pairs of intervening, diametrically opposed arcuate zones of shorter and longer axial lengths which are adaped to coincide with the corresponding shorter and longer axial length zones of the cylindrical frame wall. Projections are formed on the ends of each of the cylindrical wall zones of greater axial length adjacent the intervening wall zones of shorter axial lengths to provide a seat for the ring. One of the frame wall zones of the pair which have the greater axial lengths has a greater arcuate length than the other wall zone of that pair whereby the intervening wall zones are not diametrically opposite of each other, thereby preventing the insert ring from being installed incorrectly. The rings and frame are formed of contrasting colors to provide a visual check as to the placement of a ring in each of the frame openings.

8 Claims, 12 Drawing Figures

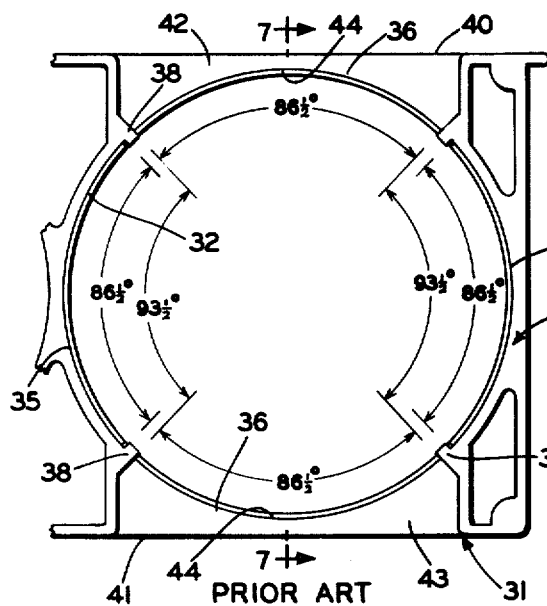
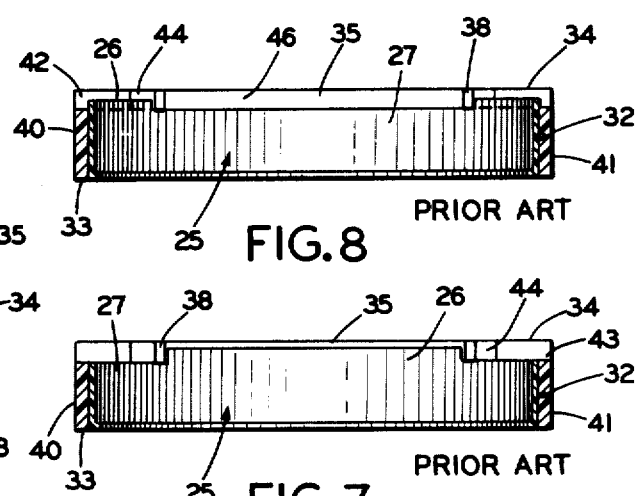
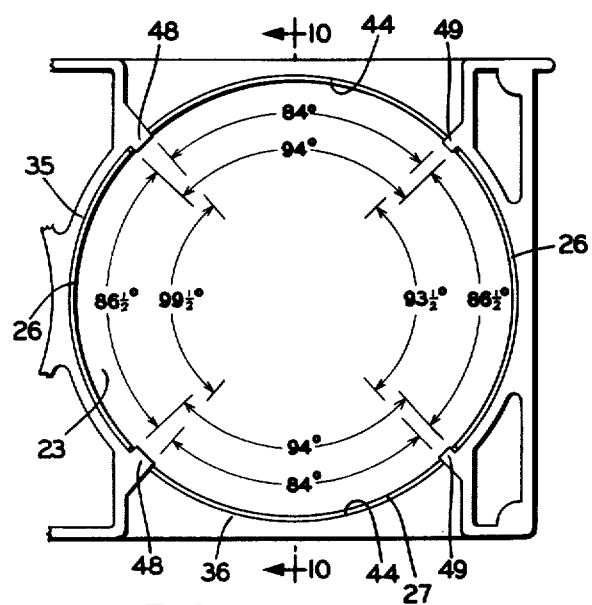
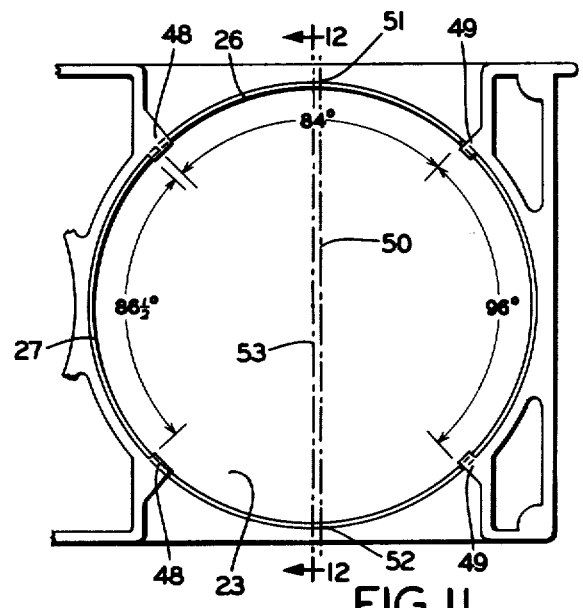
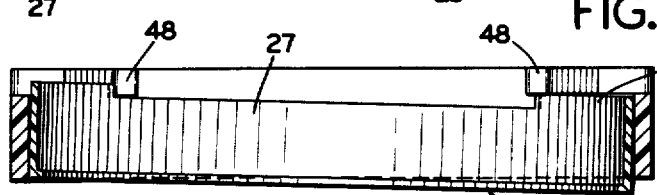
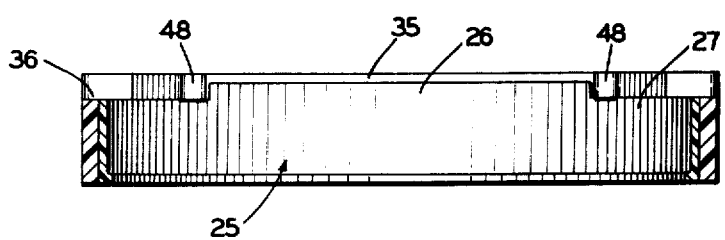

FRAME CONSTRUCTION FOR MAKING ROUND COMB HONEY

BACKGROUND OF THE INVENTION

1. Field of the Invention

The invention relates to equipment for use in making natural comb honey, and particularly to equipment adapted to be placed within a beehive in which the bees form honeycombs and deposit their honey. More particularly, the invention relates to an improved frame construction, a plurality of which are used in combination with insert rings to form cylindrical molds or containers in which honeycombs are formed, and in which the improved frames prevent the insert rings from being placed incorrectly within the frames.

2. Description of the Prior Art

There are various devices, equipment and methods of collecting the natural honey produced by bees from a beehive. One type of equipment consists of a plurality of rectangular box-like frames known as "supers" which are stacked vertically upon a beehive. Each super contains a plurality of frames, preferably formed of molded plastic, which are mounted in abutting relationship with respect to each other within each super. Each frame is provided with a plurality of cylindrical openings which form a plurality of horizontally extending cylindrically shaped chambers when a plurality of these frames are stacked in the super. A strip of beeswax (referred to as a "foundation") is placed between alternate pairs of these frames, from which the bees build honeycombs of beeswax which are filled with honey outwardly from both sides of the foundations.

A cylindrical-shaped ring is telescopically mounted within each of the frame openings, a pair of which serves as the sidewalls for each of the "rounds" of comb honey produced by the bees. Thus, each "round" which is produced within the frames consists of a central film of beeswax (foundation) with a half comb section attached to and extending outwardly from each side of this foundation.

After a variable amount of time, the frames are removed from the supers and separated, leaving a plurality of round comb sections twice the thickness of each insert ring. The rings remain attached to the honeycomb and become the container therefor for subsequent storage and shipment. In many situations, a pair of clear plastic end caps is placed on the ends of the "round" in telescopic engagement with the ends of the ring pairs. A sealing band then is placed circumferentially about these end caps and rings to form a complete package for the honeycomb.

These prior art frame sections have a plurality of cylindrical or annular-shaped walls which form the cylindrical openings in which the insert rings are seated for subsequent formation of the honeycomb round. Each of these cylindrical walls have top and bottom arcuate zones of shorter wall height (measured in an axial direction) than the intervening longer arcuate side zones. Top and bottom, when used throughout the following description, refers to the position that the frame assumes when placed within the super, in which position the cylindrical openings formed by the frames extend in a horizontal direction. These wall zones of reduced axial height or length form top and bottom slots or openings when the frame sections are joined in their respective pairs through which the bees gain access into and out of the cylindrical chambers formed by the frame pairs for making the honey-filled comb on the intervening foundations or beeswax strips.

The insert rings which are telescopically mounted within the cylindrical openings of each frame also are provided with diametrically opposed arcuate sections of reduced wall lengths with corresponding intervening arcuate sections of greater wall lengths. Inwardly projecting studs are formed on the ends of each of the longer wall sections of the frames adjacent the reduced wall sections of the frame for supporting the insert rings thereon.

Problems have occurred in these prior frame and ring constructions, in that unless precaution is taken by the beekeeper, the rings can be installed incorrectly within the frame openings with the longer wall sections of the ring being located between the projections coinciding with the shorter wall sections of the frames. This results in two main disadvantages. The first is that the longer wall sections of the rings will project beyond the frames, partially closing the bee access openings making it more difficult for the bees to enter and exit the slotted opening and the inner cylindrical chambers. More importantly, when the ring is mounted incorrectly within the frames, the shorter length arcuate wall sections of the ring will coincide with the longer length wall sections of the frame. With this mounting arrangement, an arcuate section or strip of frame is exposed beneath the bottom of the ring. The bees, upon making the honeycomb, will attach the comb to both the ring, as intended, and also to the exposed arcuate strip of the frame. Upon removal of the rings and contained honeycombs from the frames, the comb sections will be torn away from the frame causing a rupture of the cells which are attached to the exposed frame strip which was caused by the incorrect mounting of the rings within the frames. This rupture of some of the honeycomb cells permits the honey contained within the cells to leak, resulting in a lower grade honeycomb than if the cells were intact.

Another problem that occurs with existing frame constructions and the insert rings used therein is the forming of both the rings and frame of the same color plastic material. This makes it extremely difficult for the beekeeper to quickly and visually check whether a ring has been installed in each and every one of the frame openings. A rapid and easy means of determining that a ring is installed in each opening is especially desirable in view of the condition of the frames and rings which many times are covered with honey and beeswax residue, and since this inspection may be performed at the beehive site amidst a swarm of bees.

Thus, the need has existed for a frame construction which insures that the insert rings can only be inserted or seated within the cylindrical frame openings in the correct manner, wherein the shorter length ring wall sections will correspond with the shorter length frame wall sections, and correspondingly, the longer ring wall sections will coincide with the longer frame wall sections to maintain the proper sized bee access openings, and more importantly to prevent exposed sections of frame wall to which the honeycomb can be attached by the bees. It is also important that such a modification does not appreciably affect the existing frames, insert rings and super constructions, configurations and sizes, thereby preventing interchangeability between these components presently on the market and commonly used in the trade.

There is no such frame construction of which I am aware which has eliminated this ring mounting problem by increasing the arcuate lengths of the insert ring-supporting projections on the frames, whereby the rings can only be inserted in one position, which is the correct position.

SUMMARY OF THE INVENTION

Objectives of the invention include providing an improved frame construction for use in making round comb honey in a beehive which prevents accidentally mounting the insert rings incorrectly within cylindrically shaped openings formed in the frames which will reduce the size of the bee access openings and form an exposed strip of frame wall beneath the incorrectly installed ring to which the honeycomb is attached by the bees; providing such an improved frame construction which insures correct mounting of the insert rings within the frame openings by increasing the arcuate lengths of the ring-supporting projections or embossments formed on the frame walls, thereby requiring only a relatively simple, but important, modification to the existing frame, with a correspondingly relatively simple modification to existing molds and equipment for making the frames, and in which the improved frame is intended for use with existing insert rings and does not change the frame-receiving "super" structures and their mounting within a beehive and the disassembling procedures thereof to remove the formed honeycomb sections; providing such an improved frame which adds no additional costs to the existing frames except for the addition of an extremely small quantity of plastic required to form the enlarged projections during molding of the frames, yet which will save a beekeeper considerable time when installing a number of the insert rings within the frames by eliminating the careful checking heretofore required of each ring to insure that the rings are correctly installed, which checking is made more difficult by the conditions under which the beekeeper must perform such functions; providing such an improved frame construction which is molded of a contrasting color to that of the rings, whereby the beekeeper can easily determine by a casual and rapid visual inspection that a ring has been installed in each and every frame opening when installing the frames in the supers; and providing such an improved frame construction which eliminates an inconvenience and difficulty existing in the art, and which solves existing problems, satisfies needs and obtains new results in the art.

These objectives and advantages are obtained by the improved frame construction of the invention which is used in making round comb honey, the general nature of which may be stated as including a frame of the type having a generally rectangular configuration formed with a plurality of spaced cylindrical-shaped openings adapted to removably receive a ring in each of the openings, in which each of the frame openings is defined by a cylindrical wall having first and second pairs of opposed arcuate zones, with said first pair having a shorter axial height than the second pair in order to form access openings for bees when a plurality of said frames are stacked in abutting relationship within a beehive, and in which first and second pairs of inwardly extending projections are formed on the ends of the second pair of wall zones adjacent the first pair of wall zones for supporting a ring telescopically mounted within the opening formed by the cylindrical wall, wherein the improvement includes one of the wall zones of the second pair having an arcuate length greater than the arcuate length of the other wall zone of said second pair.

BRIEF DESCRIPTION OF THE DRAWINGS

A preferred embodiment of the invention—illustrative of the best mode in which applicant has contemplated applying the principle—is set forth in the following description and shown in the accompanying drawings, and is particularly and distinctly pointed out and set forth in the appended claims.

FIG. 6 is an enlarged fragmentary plan view of a quarter section of a prior art frame construction of which the improved frame is an improvement thereon, showing a ring correctly mounted within the cylindrical opening;

FIG. 7 is a sectional view taken on line 7—7, FIG. 6;

FIG. 8 is a sectional view similar to FIG. 7 showing the incorrect mounting of a ring within the cylindrical opening of the prior art frame of FIG. 6;

FIG. 9 is a fragmentary plan view of a quarter section of the improved frame construction similar to FIG. 6 showing the improvement thereon, with an insert ring being mounted correctly within the cylindrical opening;

FIG. 10 is an enlarged sectional view taken on line 10—10, FIG. 9, showing a ring correctly mounted within the cylindrical opening of the improved frame construction;

FIG. 11 is a fragmentary plan view similar to FIG. 9 showing a ring attempted to be mounted incorrectly within the cylindrical opening of the improved ring construction; and FIG. 12 is an enlarged sectional view taken on line 12—12, FIG. 11, showing that the insert ring cannot be inserted incorrectly within the improved frame opening.

DESCRIPTION OF THE PREFERRED EMBODIMENT

Figure 1:
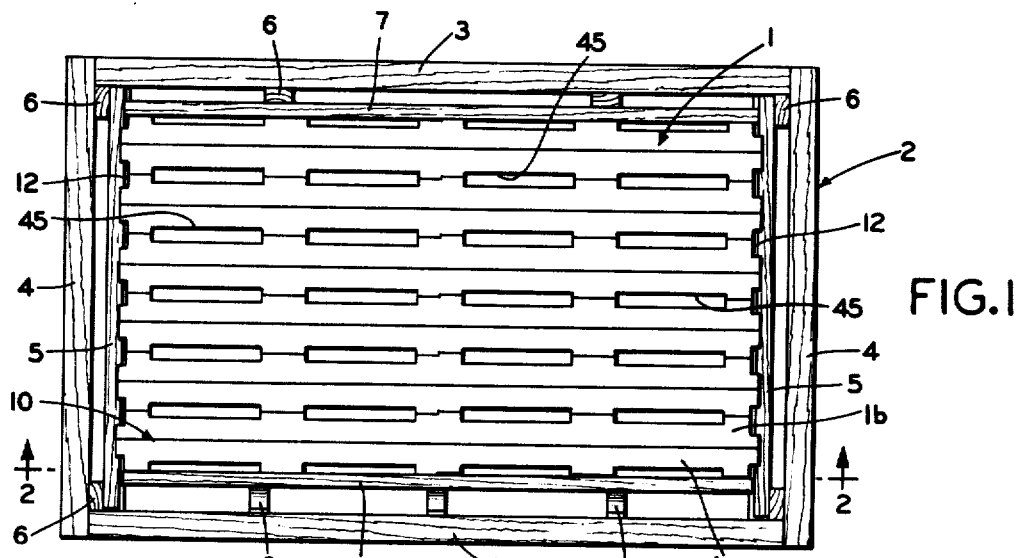
FIG. 1 is a top plan view of a plurality of the improved frame constructions mounted within a supporting super structure prior to placement within a beehive.

The improved frame construction of the invention is indicated generally at 1, with a plurality of these frames being shown mounted in their usual manner, in abutting relationship within a rectangular frame structure 2, referred to as a "super". Super 2 is a rectangular frame formed by spaced pairs of parallel side and end walls 3 and 4, together with a pair of fixed end boards 5 which are spaced from end walls 4 by spacer blocks 6, and a pair of loosely mounted side boards 7 and 8. Side boards 7 and 8 are spaced from side walls 3 by additional spacer blocks 6 and a plurality of leaf-like springs 9. Twelve of the improved frames 1 are shown mounted within super 2, although this number may vary appreciably without affecting the concept of the invention.

Figure 2:
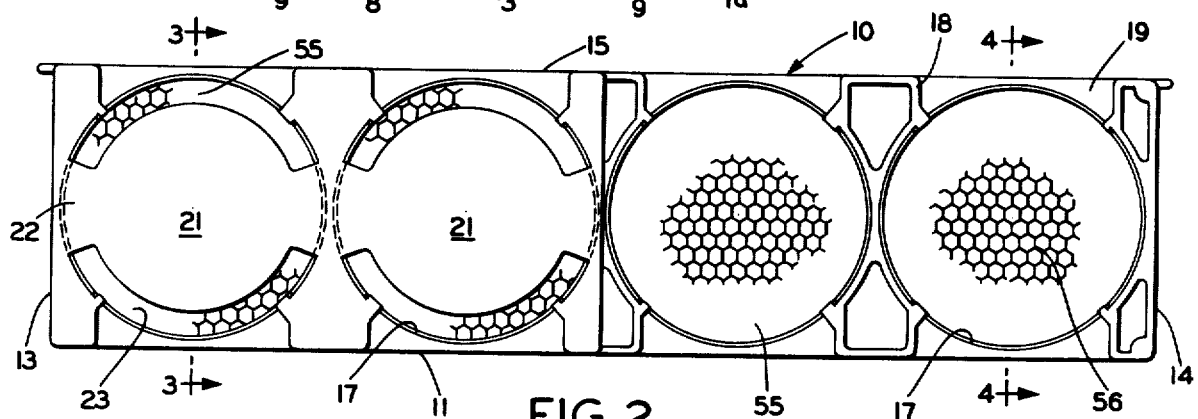
FIG. 2 is an enlarged elevational view of a pair of the improved frame constructions looking in the direction of arrows 2—2, FIG. 1, removed from the super of FIG. 1, and having a beeswax foundation mounted therebetween.
Figure 3:
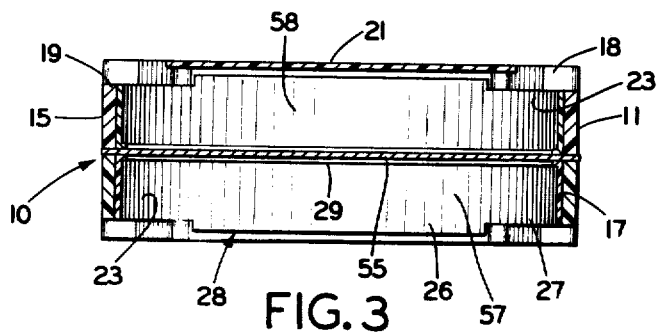
FIG. 3 is an enlarged sectional view taken on line 3—3, FIG. 2.
Figure 4:
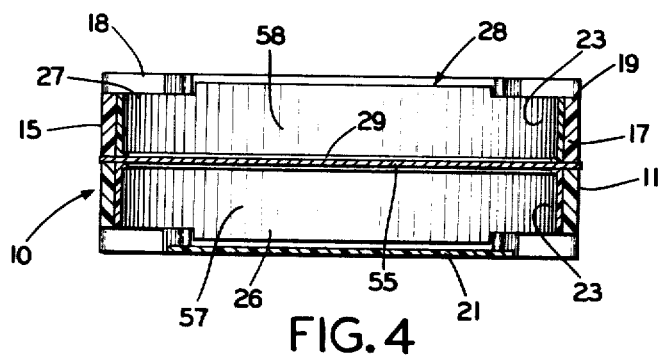
FIG. 4 is an enlarged sectional view taken on line 4—4, FIG. 2.

FIGS. 2, 3 and 4 shown several views of a pair of improved frames 1, indicated as 1a and 1b, assembled together to form a usual comb honey-making unit 10 for mounting within super 2. Frames 1, when mounted within super 2, will assume a position similar to that shown in FIG. 2, wherein frame bottom edge 11 will be supported on a pair of horizontally extending metal angle brackets 12, with frame edges 13 and 14 extending vertically upwardly, and with top edge 15 lying in a horizontal plane. Thus, FIG. 1 illustrates a top plan view of the abutting frames 1 with FIG. 2 providing a good illustration of an elevational view of one side of the improved frame.

Improved frame 1 has a generally rectangular configuration, as shown in FIG. 2, and preferably is molded of a lightweight plastic material. In addition to the parallel top, bottom and end edges of the frame described above, a plurality of cylindrically shaped walls 17 are formed in a spaced series-like arrangement along frame 1 within the confines of top and bottom edges 11 and 15 and end edges 13 and 14. Cylindrical walls 17 are formed integrally with and are connected to the peripheral edges of the frame by a pluarlity of reinforcing ribs 18 and intervening webs 19, respectively. Preferably, each frame will include an even number multiple of two, cylindrical walls 17. The particular embodiment described has four cylindrical walls 17 which is the usual number in the frames used by many beekeepers.

A pair of relatively thin, disc-shaped end panels 21 are formed integrally with and are connected to the frame by segments 22, and partially close the ends of two of the cylindrical openings 23 which are formed by each cylindrical wall 17. A pair of posts (not shown) are mounted at the top and bottom of each frame 1 adjacent end edge 14 to provide a snap-fit engagement within a recess formed between top and bottom reinforcing ribs (not shown) and the opposite end wall 13. These posts and recesses provide a means of removably connecting together a pair of frames 1, as shown in FIGS. 3 and 4, to form unit 10 which forms four round comb honey chambers or "rounds" therein.

A plurality of these joined pairs of frames 1 or units 10 then are stacked in abutting relationship, as shown in FIG. 1 within super 2.

Figure 5:
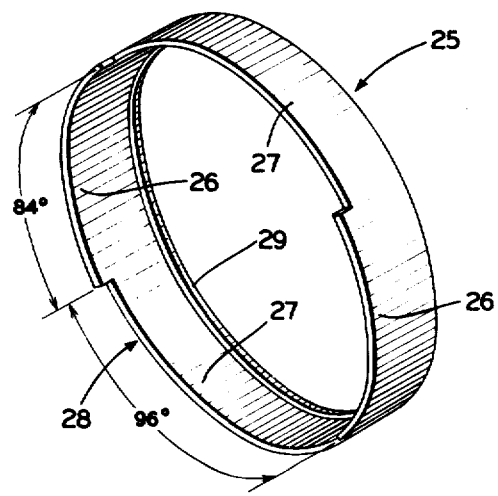
FIG. 5 is an enlarged perspective view of one of the insert rings which is mounted in the cylindrical openings of the improved frame construction.

An annular or cylindrical shaped insert ring, indicated generally at 25 (FIG. 5), is adapted to be telescopically mounted within each of the cylindrical openings 23 in juxtaposition with cylindrical frame walls 17. The purpose of rings 25 is discussed in detail below. Ring 25 has a pair of diametrically spaced, arcuate zones or sections 26 which have a greater height or axial length than a pair of diametrically spaced, intervening arcuate zones or sections 27. The arcuate length of "shorter" zones 27 is greater than the arcuate length of the "longer" zones 26. Shorter zones 27 have an arcuate length of approximately 96° with longer zones 26 having an arcuate length of approximatetly 84°. These zones form a stepped, circular-shaped, outer, peripheral edge 28 with the inner peripheral edge 29 of ring 25 having a continuous, smooth circular shape.

FIGS. 6, 7 and 8 show the prior art configuration of frame 1, which is indicated at 31 and which is similar to frame 1 except for the improved configuration and size of cylindrical frame wall 17 in contrast to the cylindrical frame wall component of frame 31, which is indicated generally at 32. An understanding of this prior configuration is believed necessary to completely understand and appreciate the features of the invention. The prior art cylindrical frame wall 32 includes a continuously smooth circular-shaped inner edge 33 and a step-shaped outer peripheral edge 34 similar to frame wall 17. The terms inner and outer are used to refer to the edges of frame wall 32 with respect to their particular location when a pair of frame assemblies are snapped together when forming a unit similar to unit 10, shown in FIGS. 2, 3 and 4. FIGS. 6, 7 and 8 only show a single prior art frame with a ring 25 mounted therein and not an assembled unit 10, as in FIGS. 3 and 4.

Cylindrical wall 32 is formed with a pair of diametrically opposed arcuate zones or sections 35 which have a greater height or axial length than the intervening pair of diametrically spaced arcuate zones or sections 36 which have a shorter height or axial length. In this prior art frame, the "shorter" zones 36 have an arcuate length of approximately 86½°, as shown in FIG. 6. A plurality of projections or embossments 38 are formed integrally with and project inwardly from the ends of longer zones 35 and have a height equal to the difference in height between longer zone 35 and shorter zone 36 of frame wall 32 to provide a seat for insert rings 25 when mounted therein.

Top and bottom edges 40 and 41 of prior art frame 31 are formed with cut-out areas 42 and 43, respectively, adjacent the outer sides of frame 31 which communicate with arcuate openings 44 formed between the spaced pairs of projections 38 due to the stepped configuration of cylindrical wall 32. Cut-out areas 42 and 43 and arcuate openings 44 form a plurality of rectangular-shaped slot-like openings 45 when a plurality of the frames are in an abutting relationship, as shown in FIG. 1 with respect to improved frame 1. This provides top and bottom access openings into adjacent comb-producing chambers formed by assembled pairs of frames into a unit similar to unit 10.

The arcuate spacings and sizes or projections 38 as shown for the prior art frame 31 in FIG. 6 permitted ring 25 to be seated within the cylindrically formed frame openings in both the correct position of FIG. 7 and the incorrect position of FIG. 8. In the correct position of FIG. 7, longer zones 26 of ring 25 will be located between projections 38 coinciding with longer zones 35 of cylindrical wall 32. Ring 25, however, can be installed incorrectly (FIG. 8) with longer zones 26 coinciding with shorter frame wall zone 36. In this incorrect position, the outer portion of longer ring zone 26 will extend beyond the surface of the frame and into cut-out areas 42 and 43 and comb chamber access openings 44. More importantly, shorter zones 27 of ring 25 will leave an exposed strip of area 46 (FIG. 8) on frame wall 32 between the outer edge of ring zone 27 and the outer edge of cylindrical wall zone 35. It is this area of exposed strip 46 onto which the bees will attach the honeycomb which ruptures upon removal of the combs and attached rings from the frames.

FIGS. 9-12 show in greater detail the improvement of frame 1 with respect to prior art frame 31. The improvement consists primarily of enlarging the arcuate lengths of two of the ring-supporting studs or projections indicated at 48 (FIG. 9) while maintaining the size of the other pair of projections 49 the same as studs 38 of frame 31. As can be seen from a comparison of FIG. 9 with respect to FIG. 6, projections 48 have been enlarged from approximately 3½° to 6½° so as to extend further into top and bottom arcuate openings 44. This reduces the arcuate spacing between the edges of the top and bottom projection pairs from 86½° to approximately 84° at both the top and bottom openings. The intervening arcuate spacings remain the same at approximately 86½°.

FIGS. 9 and 10 show ring 25 correctly mounted within cylindrical opening 23 in which longer ring zones 26 coincide with the longer zones 35 of the cylindrical frame wall 17, and with the shorter ring zones 27 coinciding with the shorter frame zones 36. This is possible since the arcuate lengths of longer ring zones 26 (approximately 84°) will fit within the arcuate openings between an enlarged projection 48 and its corresponding smaller projection 49 which is approximately 86½°. Likewise, smaller zones 27 of ring 25, which have arcuate lengths of approximately 96° (FIG. 5), will seat on adjacent pairs of projections 48 and 49.

The most important feature achieved by the improved invention is shown in FIGS. 11 and 12, wherein a ring 25 is attempted to be installed incorrectly within cylindrical opening 23 of frame wall 17. One of the longer ring zones 26 can still be located and inserted between adjacent pair of studs 48 and 49 since this spacing is 84°, which is equal to the arcuate lengths of the longer ring zones. This is shown in the bottom portion of FIG. 11. However, the diametrically opposite longer ring zone 26 will not seat within the corresponding 84° opening between the other pair of projections 48 and 49 even though the arcuate lengths are compatible for insertion. This desired result is achieved since the 84° arcuate openings between the generally diametrically opposite pairs of projections are not truly diametrically opposite with respect to each other. This is shown by dot-dash line 50 (FIG. 11) which extends between midpoints 51 and 52 of the two equal arcuate sections between the projections at the top and bottom of the frame. The true centerline for cylindrical opening 23 is shown by dot-dash line 53.

Therefore, the smaller ring zone 27 at the left-hand side of FIG. 11 will not seat over the top left-hand enlarged projection 48, as shown in FIG. 11 and in FIG. 12. This causes the ring to tilt within its cylindrical opening which provides a good visual indication that the ring is incorrectly mounted in opening 23. Ring 25 need only be rotated approximately 90° to the position of FIG. 9, wherein longer ring zones 26 are located between adjacent right or left-hand pairs of projections 48—48 and 49—49.

In essence, the enlarging of projections 48 merely results in lengthening the over-all arcuate length of one of the wall zones 35 from its previous arcuate length of approximately 93½° (FIG. 6) to its new arcuate length of 99½° (FIG. 9) while maintaining the same arcuate length (93½°) for the other wall zone 26. It is this forming of one of the opposed zones of the cylindrical frame larger than its opposite wall zone while maintaining the same arcuate spacing between the two ends of these zones that provides the desired results, that is, prevention of the incorrect mounting of ring 25 within the frame openings.

As discussed above, FIGS. 2, 3 and 4 show a pair of these improved frames assembled together with an intervening strip of beeswax 55 which has a honeycomb configuration 56 embossed therein, which provides a pair of chambers 57 and 58 (FIGS. 3 and 4) in which the bees build the honeycomb sections, two of which form a "round" which is subsequently removed from the frame pairs.

Accordingly, what appears to be a relatively simple modification to the prior art frame 31, that is, the elongating of two of the ring-supporting projections, provides a construction which completely eliminates the problem of incorrectly mounting a ring within the frame openings without materially changing any other component of the round comb honey-making equipment.

Another important feature of the invention is producing improved frame 1 with a contrasting color with respect to rings 25. Preferably, frames 1 are molded with a dark brown color, with rings 25 being molded of a white color, as has been the practice in the trade. This enables the beekeeper to quickly and easily determine by visual inspection whether a ring is mounted within each of the frame openings, whereas in the past the frames 31 have also been molded of a white color plastic similar to that of rings 25, making it extremely difficult to rapidly determine if a ring is installed in each opening. This is important since a considerable number of rings and frames are used in each super and in each beehive.

In the foregoing description, certain terms have been used for brevity, clearness and understanding, but no unnecessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details of the construction shown or described.

Having now described the features, discoveries and principles of the invention, the manner in which the improved frame construction for making round comb honey is constructed, assembled and operated, the characteristics of the new construction, and the advantageous, new and useful results obtained; the new and useful structures, devices, elements, arrangements, parts, and combinations are set forth in the appended claims.

I claim:

1. A frame construction for use in making round comb honey of the type having a generally rectangular configuration formed with a plurality of space cylindrical-shaped openings adapted to removably receive a ring in each of the openings, in which each of the frame openings is defined by a cylindrical wall having first and second pairs of opposed arcuate zones, with said first pair having a shorter axial height than the second pair in order to form access openings for bees when a plurality of said frames are stacked in abutting relationship within a beehive, and in which first and second pairs of inwardly extending projections are formed on the ends of the second pair of wall zones adjacent the first pair of wall zones for supporting a ring telescopically mounted within the opening formed by the cylindrical wall, wherein the improvement includes one of the wall zones of the second pair having an arcuate length greater than the arcuate length of the other wall zone of said second pair.

2. The frame construction defined in claim 1 in which the first pair of projections which is formed on the ends of said one wall zone of the second pair of wall zones, have greater arcuate lengths than the second pair of projections which is formed on the ends of said other wall zone of the second pair of said wall zones.

3. The frame construction defined in claim 2 in which the first pair of projections have an arcuate length of approximately 6½° and the second pair of projections have an arcuate length of 3½°.

4. The frame construction defined in claim 1 in which the first pair of the wall zones each have an arcuate length less than the arcuate length of either of the second pair of wall zones.

5. The frame construction defined in claim 4 in which the wall zones of the first pair have generally equal arcuate lengths.

6. The frame construction defined in claim 5 in which the wall zones of the first pair each have an arcuate length of approximately 84°.

7. The frame construction defined in claim 1 in which the arcuate lengths of the second pair of wall zones are approximately 99½° and 93½°; and in which the arcuate lengths of the first pair of wall zones are approximately 84° each.

8. The frame construction defined in claim 1 in which the frame is formed of an integrally molded plastic material having a dark color.

* * * * *